Jan. 7, 1936.                L. J. GRUBMAN                2,027,165
               MOLDING OF DOLLS' HEADS AND THE LIKE
                Original Filed Feb. 7, 1932    5 Sheets-Sheet 2

INVENTOR
LEO J. GRUBMAN
BY
ATTORNEYS

Jan. 7, 1936.   L. J. GRUBMAN   2,027,165
MOLDING OF DOLLS' HEADS AND THE LIKE
Original Filed Feb. 7, 1932   5 Sheets-Sheet 3

INVENTOR
LEO J. GRUBMAN
ATTORNEYS

Jan. 7, 1936. L. J. GRUBMAN 2,027,165
MOLDING OF DOLLS' HEADS AND THE LIKE
Original Filed Feb. 7, 1932 5 Sheets-Sheet 4

INVENTOR
LEO J. GRUBMAN
BY
ATTORNEYS

Jan. 7, 1936.    L. J. GRUBMAN    2,027,165
MOLDING OF DOLLS' HEADS AND THE LIKE
Original Filed Feb. 7, 1932    5 Sheets-Sheet 5

INVENTOR
LEO J. GRUBMAN
BY
ATTORNEYS

Patented Jan. 7, 1936

2,027,165

UNITED STATES PATENT OFFICE 2,027,165

MOLDING OF DOLLS' HEADS AND THE LIKE

Leo J. Grubman, Belle Harbor, N. Y., assignor to Margon Corporation, New York, N. Y., a corporation of New York Continuation of application Serial No. 591,947, February 7, 1932. This application March 16, 1934, Serial No. 715,901

13 Claims. (Cl. 18—4)

This invention relates to dolls, and more particularly to a novel apparatus for molding dolls' heads or like products.

Dolls' heads as heretofore manufactured are universally molded in two halves, a front or face half, and a back half. The head is molded of a cheap mixture made of wood pulp or wood flour, starch, a little resin, and water, a quantity of which is placed between gas heated molds, and compressed by hand presses to a relatively light pressure, the excess material escaping at the edges of the mold. No openings are left in either half of the head, and the material is molded to considerable thickness in order to facilitate cementing the halves together in edge to edge contact. After the cementing operation, the resulting rough edges are ground to remove irregularities and flash, after which a white cement or filler is used to patch openings and recesses in the edges. This patching must be sandpapered, and the entire head, because of the roughness and porosity of the material, is dipped in a heavy size or glue to prepare it for receiving the spray painting and final finishing.

The object of the present invention is to generally improve the foregoing process and to overcome its obvious difficulties in manufacture and deficiencies in product. More particularly, some objects of the present invention are to shorten the molding and finishing time needed to produce a complete head; to avoid the cementing of halves of the head together; as well as to avoid the grinding, patching, and sandpapering operations of the present practice. These objects are fulfilled by molding the complete doll's head in a single molding operation, and accordingly a primary object of the present invention is to devise a process and apparatus making it possible to thus mold a complete doll's head in a single molding operation, in a rapid, expeditious, and economical manner.

The doll's head produced by the prior practice is rough and porous, and consequently must be treated with size before it can be properly finished. This difficulty has led to the suggestion of molding the head out of some better material than the ordinary wood pulp and starch mixture, as, for example, phenolic condensation products, with a view to obtaining accurate dimension and smooth finish, but such materials are exceedingly costly. Another important object of the present invention is to so mold the doll's head, or, for that matter limbs, body, or other toy parts, out of the ordinary cheap wood flour material, that the resulting product is practically a new substance which is hard, dense and compact in structure, strong and resistant to breakage even when thin-walled, smooth and accurate in finish, and not characterized by warping, shrinkage, or other change in dimension found in prior art heads. Ancillary objects of the invention considered in this phase are to accurately and reproducibly control the baking temperature and time and pressure conditions so as to insure uniformity of product. A further and related feature of my invention includes a preferably preliminary weighing-out or measuring of the molded material into uniform amounts for use when loading the mold. A further and optional object of the invention is to increase the convenience of handling the molding material when practicing the process, and with this in view, the preferably measured or uniform amounts of molding material may be compressed and formed into tablets especially adapted by their configuration to be later directly placed in my new molding apparatus without loss of time when performing the process in a rapid and continuous manner. This step is convenient, but dispensible rather than essential.

To produce the desired dense and flawless product, it is essential to avoid porosity and blowholes due to entrapped steam or other gases generated during the pressing and baking operation. Accordingly, further objects of the present invention are to avoid these defects and permit a perfectly free escape of gases from the mold during the molding operation, and yet at the same time to avoid such rupture of the product being molded as would be caused by an actual mechanical or forcible separation of the halves of the mold for an appreciable distance. More particularly, the pressing process includes heating and intermittently pressing the halves of the mold together by a series of pressings each bringing the halves of the mold progressively nearer together until the mold is closed, the pressure between or upon the halves of the mold being not only relieved, but actually opposed between the successive pressings, so as to freely permit the escape of steam or other gases generated in the heated material, but in the meantime the halves of the mold are in no way mechanically or forcibly pulled apart or separated for a substantial distance. Of course, the halves of the mold may be very slightly moved apart by the escaping steam itself during the relief or blow-off periods, but other than this slight self-adjusting and almost unnoticeable movement, there is no tearing apart of the halves of the mold with consequent rupture of the embryo head within the mold.

The aforesaid intermittent pressing and heating operation may, for convenience, be called a steaming operation, and takes place preliminary to or as the first part only of the complete baking operation needed to produce the finished product. A further and important object of the present invention is to greatly reduce the time in which a mold must be kept in the press, so that the heads may be molded in rapid succession while using only a single press. To this end, I find it feasible and desirable to perform only the steaming operation in the press and to lock the mold at the end of the steaming operation, after which the mold may be quickly transferred into a separate baking oven for the remainder of the baking period.

The conventional head as heretofore molded does not include eye openings, but instead these openings are long afterward punched in the head and subsequently frazed—operations which are troublesome and yet which do not produce accurate spacing and alignment of the resulting eye openings. There are a number of reasons why these openings are not molded directly in the head, one of which is that dipping of the head in a thick size or mixture of glue and filler is troublesome and difficult not only because it tends to fill the head, but, even more importantly, because the thick liquid would cover the surface of the eye sockets as well as the localities provided for the mounting of the eye set, and would clog up these surfaces and impair proper mechanical operation of the eye set. With the present product, no heavy sizing is needed, and consequently the finishing coat may be thin and therefore may be applied with a spray gun instead of by dipping. The spraying process in itself is sufficient to prevent entry of the paint on the surface of the sockets, but even if the paint does coat the sockets, and, in fact, even if a dipping process is used instead of a spray gun, the resulting coating is thin and does not change the form of the surfaces in question to sufficient extent to impair the mechanical operation of the eyes. Obviously the prior art product with its rough porous surfaces and crude cemented seam made essential the now dispensible dipping or sizing operation to which the head was subjected, as described at the beginning of this specification. Further objects of the present invention are to eliminate punching and frazing of eye openings, and to make possible the molding of eye or/and mouth openings directly in the doll's head; to make such openings accurate in size, spacing, and alignment; and, if desired, to directly mold special mounting means within the doll's head for subsequently receiving and supporting the movable eyes or eye set for the eye openings.

The molding in a single operation of a complete doll's head obviously requires some form of destructible core. Attempts heretofore made to use a collapsible core have never proved successful or commercial, and accordingly additional important objects of the present invention are to provide a process and apparatus involving the use of a destructible core of a practical type, and particularly the use of a fusible core; to make possible accurate location of the fusible core within the mold with a view to producing a thin-walled head; to make possible rapid production of the cores, each being used only a single time; to devise a convenient method for melting the core from the head and for readily recovering and re-using the molten metal; to provide a final maximum compression of the molded substance before removing the core therefrom; and to fuse the core as a direct continuation of the baking process, so that the heat of baking may be used for fusing the core, and conversely, the heat used for fusing the core may be applied as an effective part of the baking operation.

Further objects of the present invention center particularly about the provision of a wholly continuous and substantially automatic process and apparatus for making dolls' heads in the manner outlined, in a rapid and uninterrupted series by large-scale machine production.

The more detailed specification which follows is a continuation of my application Ser. No. 591,947, filed Feb. 10, 1932.

To the accomplishment of the foregoing and such other objects as may hereinafter appear, my invention consists in the apparatus elements and their relation one to the other, as hereinafter are more particularly described in the specification and sought to be defined in the claims. The specification is accompanied by drawings, in which:

Referring to the drawings and more particularly to Figs. 4 through 7 thereof, the present invention is preferably practiced by the use of a mold such as is there illustrated. This mold comprises, generally, a lower half 12, an upper half 14, a non-fusible core-supporting arbor 16, a non-fusible core portion 18, and a fusible core 20. Top and bottom plates have been omitted in the drawings. By way of introduction, it may be stated that large numbers of the fusible core 20 are produced by a simple die-casting operation, and that a fusible core is slipped onto the core-supporting arbor 16 for each molding operation, the fusible core being subsequently melted from the finished head at the end of the baking operation. The remainder of the mold other than fusible core 20 is, of course, indestructible and used repeatedly and indefinitely.

Mold 12 is supported by and may be formed integrally with a bolster 22, while mold 14 may similarly be supported by and formed integrally with a bolster 24. The lower mold is provided at diagonally opposite corners with projections 26 in which rods or dowel pins 28 of ample size are permanently secured. The upper half of the die is similarly provided with mating projections 30 bored to receive dowel pins 28 with an accurate sliding fit. The arrangement shown insures perfect alignment of the upper and lower halves of the mold, even when the same are separated by a considerable space, as at the very beginning of the molding operation.

Core-supporting arbor 16 may be removably related to the mold in a number of ways, that here shown consisting in a pivotal mounting at the axis 32. The arbor is itself made rigid and strong, and it is rigidly and accurately mounted on the mold by means of a barrel 34 the bifurcated trail or legs 36 of which are supported on the pin 32 itself held between bearings 38 on the lower half of the mold. When the mold is open, the arbor may be swung from the position shown in Figs. 4, 5, and 6 to the position shown in Fig. 7, the upward movement being preferably limited by stops 40 on legs 36. The downward movement or operative position of the arbor may be accurately defined by pedestal 42 on the lower half of the mold cooperating with a stop 44 on the barrel 34.

The arbor 16 is provided with a non-fusible core portion 18 fixedly mounted thereon, and is further provided with a longitudinal keyway 50 for cooperation with a mating key formed on fusible core 20. The axial position of fusible core 20 on arbor 16 is accurately determined by the non-fusible core portion 18, and the rotative position of fusible core 20 on arbor 16 is accurately determined by keyway and mating key 50. Furthermore, the fit of core 20 on arbor 16 is made quite accurate; and to facilitate insertion and removal of the core, the arbor is given considerable taper. It should also be noted that the arbor is made hollow and is preferably as thin-walled as possible compatible with rigidity and strength, this feature being intended to facilitate heating of the core and baking of the head from within, as well as final fusion of the core.

The lower half of the mold preferably corresponds to the face or frontal portion of the doll's head, and may be provided with openings 52 corresponding to the eye openings of the head, and a large clearance 54 beneath openings 52 through which the molten core metal may be drained. The mold is provided with locking or latch means to keep the same in closed condition during the baking operation, said latch means comprising latch pins 56 located on the lower mold, and latches 58, pivotally mounted at 66, on the upper mold for engaging latch pins 56. Dowel pins 28 are preferably provided with compression springs 62 between the halves of the mold, for a purpose subsequently described. The meeting edges of the mold are preferably reduced in area, as is best indicated at 63 in Fig. 6, in order to cleanly sever the exuded or flash material.

Figures 3, 7, 8, 9:
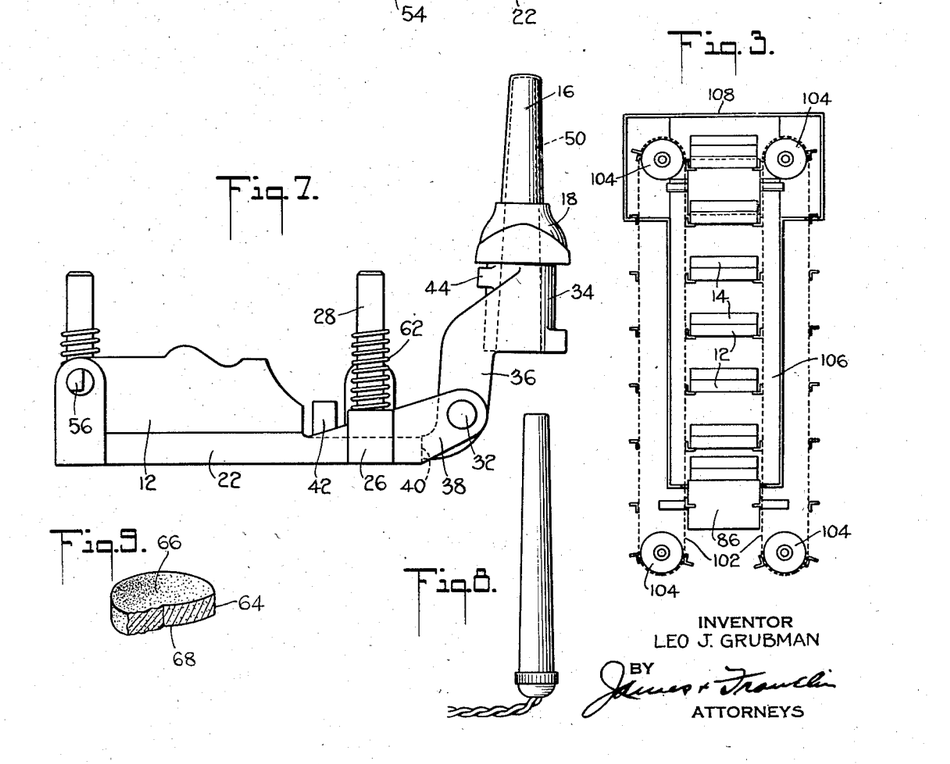
Fig. 3 is a section taken in the plane of the line 3—3 in Fig. 1.
Fig. 7 is a side elevation of the lower half of the mold with the core-supporting arbor in elevated position.
Fig. 8 is an auxiliary heating unit designed for use with the core-supporting arbor.
Fig. 9 is illustrative of a preformed tablet of wood flour molding material for use in the molding operation.

The material used for the doll's head may be the conventional cheap wood flour mixture employed heretofore. This mixture consists essentially of wood pulp, starch, a small amount of resin, and dampening moisture. In accordance with one optional feature of the present invention, the amount of material used in the molding operation may be accurately determined and the material conveniently handled by preforming the measured quantities of the material into tablets. These tablets may assume any preferred shape, such as is illustrated in Fig. 9, in which the tablet 64 is in the form of a disc or biscuit which is centrally dished so as to present a concave surface 66 on one side, and a convex surface 68 on the opposite side. By introducing a slightly increased amount of moisture in the wood flour mixture, the tablets may be made self-sustaining, although, of course, they must be handled with reasonable care.

The molding operation, assuming fusible core 20 and the tablets to have been preliminarily made, consists essentially in placing a tablet 64 and therefore a measured quantity of the molding material in the lower half of the mold, swinging the core 20 and arbor 16 downwardly into the lower half of the mold on top of the molding material, placing another tablet of molding material in inverted position on top of the core, and then adding the upper half of the mold. The halves of the mold at this time are separated by the molding material. The mold is heated to cause the molding mixture to react, and this is accompanied by evolution of considerable gas, largely steam. During the heating of the mold, the halves are intermittently pressed together by a series of pressings each bringing the molds progressively nearer together until the closed condition is reached, at which time latches 58 automatically engage and keep the mold in closed condition. To facilitate the escape of gases from the mold, the pressure on the mold is relieved between each of the aforesaid series of pressings. However, it is highly undesirable to permit blowing off of gases by actually lifting or elevating the upper half of the mold together with the press used to close the same, for this tends to tear apart and rupture the molding material or embryo head at the parting face of the mold, so that the finished product is marred at the resulting seam. Instead, in accordance with the present invention, the compression springs 62 are provided between the halves of the mold, and these springs are so designed as to very nearly but not quite counteract the weight of the upper half of the mold. When the pressure is relieved between the series of pressings, the upper half of the mold is not elevated, but is simply left in place. Because of the absence of pressure even to the extent of the weight of the upper half of the mold, the evolved gases may escape readily and freely. This in turn results in the absence of blow-holes and flaws in the finished head, and at the same time no rupture or spoilage of the product takes place at the parting line of the mold. The finally closed and locked mold may then be baked for a suitable period, say five minutes, at an appropriate temperature, preferably 250 to 300° F., after which the core 20 may be melted from the mold. Heat is applied to the inside as well as the outside of the head, for furnace heat is transmissible through hollow arbor 16. The baking temperature and time may be so interrelated that at the end of the baking operation the temperature will somewhat exceed 300° F., with consequent fusion of core 20. In some cases, it may be desired to more widely separate the preferred baking temperature of the molding material and the fusion temperature of the core, in which case fusion of the core may be aided by the direct application of heat within arbor 16. For this purpose, an electrical resistance heating unit is provided, such a unit being shown in Fig. 8 and being properly dimensioned so that it may be either temporarily or permanently inserted within hollow arbor 16. If left permanently in the arbor, it will be appreciated, of course, that the flow of current to the resistor will be interrupted except when it is desired to melt out the core from the baked head.

The molten metal from the core flows through openings 52 and 54, and may be caught in any suitable receptacle and re-used in a die-casting machine of conventional type to form additional fused cores.

Because of the accurate location of the core within the mold, and because there is no necessity to cement two halves together to form the head, the head wall may be made quite thin and light. The product, however, is exceedingly strong, and can be broken with only the utmost difficulty, because the material hardens and sets into a compact homogeneous solid which is non-porous, hard, smooth, and wholly unlike that heretofore produced from a wood flour mixture such as has been described. In fact, the resulting product resembles expensive materials such as phenolic condensation products in the fineness and accuracy of detail and smoothness of finish which may be obtained. Except for a slight grinding of an exceedingly thin flash or fin at the parting line of the mold, the head when removed from the mold is immediately ready to receive spray paint and coloring, without any sizing operation.

The improved nature of the product is probably due to the fact that the material is steamed and subsequently baked at much higher pressures than have heretofore been used. This increased pressure is caused by the resistance to flow of the molding material from its original tablet form to the full head shape, because with a thin wall this resistance to flow is greatly increased. Furthermore, the thin wall results in more thorough baking throughout the material. The permitted free escape of gas is probably also important. During the baking process, heat is admitted to the core, and this consequently expands, thereby additionally compressing the molding material as it is being baked.

The head may be provided with eye openings, and these are accurately shaped, spaced, and located. The desired accurate location is obtained without punching or frazing; is not affected by subsequent shrinkage or warping; and consequently the movable eyes or eye set may be applied directly to the head without careful adjustment of the eyes. The provision of eye openings is made possible, first, because of the nature of the core and the molding process, which does not necessitate extraction of the core in whole or in parts; and secondly, because the excellent finish of the material of the head makes dipping of the head in size unnecessary.

Furthermore, because of the destructible or fusible nature of the core used when molding the head, there is no obstacle to the formation of peculiar undercuts, ridges or recesses within the doll's head. It is therefore possible to mold appropriate mounting means within the doll's head for receiving any preferred form of eye set. In the present case, such mounting means have been generically indicated by the seats 70 (see Fig. 6) for receiving the ends of the eye set. In the practice the exact form of the seats will be determined by the kind of eye set to be later inserted.

Figure 1:
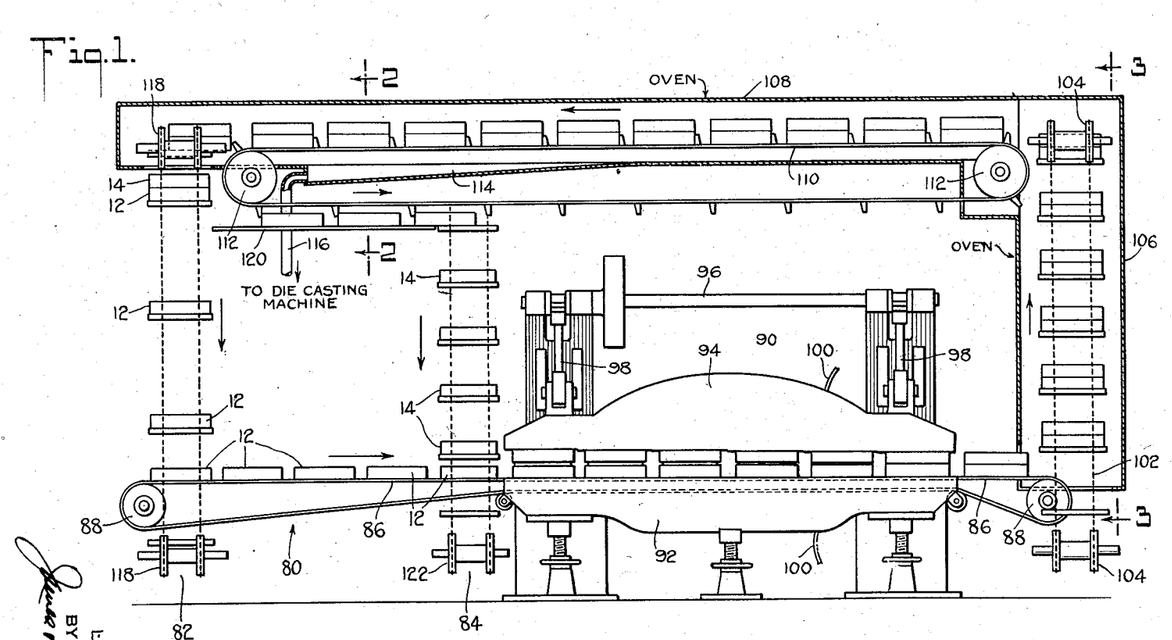
Fig. 1 is a partially sectioned elevation illustrative of apparatus for practicing the process of the present invention.
Figure 2:
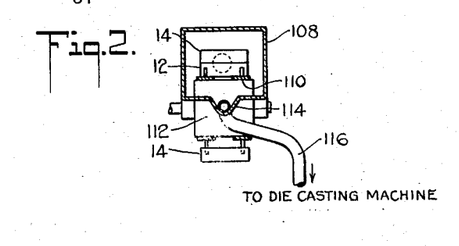
Fig. 2 is a section taken in the plane of the line 2—2 in Fig. 1.

In actual operation, the steps heretofore outlined are accurately controlled in rapid series, and the heads are preferably made on a large scale by continuous automatic machine production. A machine layout for this purpose is illustrated in Figs. 1, 2, and 3 of the drawings, and the preferred mode of practicing the present invention will next be described by reference thereto. Molds such as have already been described are provided in sufficient number to fill the complete circuit of the machine or apparatus layout shown. The lower halves of the molds 12 are loaded with cores and raw molding material while moving past a loading station 80, located between downwardly operating elevators 82 and 84, which in this specification will, for convenience and brevity, be referred to as lowerators.

The lower halves of the mold 12 are moved by an endless conveyor 86 operated by drivers 88. The lower mold 12 during its movement at the loading station 80 is provided with a fusible core 20, then a bottom tablet, after which the core is lowered and has placed thereon a top tablet of molding material, just as has already been described, the sole difference being that the mold is in motion and may, if desired, be loaded by several attendants each fulfilling a part of the loading process. As the loaded mold reaches lowerator 84, it has added thereto a mating upper mold 14. The complete mold then passes through a press 90 comprising an elongated stationary lower platen 92, an elongated vertically reciprocable upper platen 94, and appropriate mechanism including a drive shaft 96 and connecting rods 98 for operating the upper platen 94 through a predetermined limited stroke. These platens are preferably heated, as through electric or steam conductors 100, and the side faces are preferably enclosed by heat-retaining walls, not shown.

It should be carefully noted that the working face of upper platen 94 is stepped, rather than straight, and in the specific case here shown, six steps are provided, each differing in elevation from the next preceding one by a small amount, say one-thirty-second of an inch. The movements of conveyor 86 and press 90 are, of course, properly synchronized, so that the mold is pressed while located squarely beneath each of the steps of the press. Thus, when the loaded mold is first pressed, it is forced to within three-sixteenths of its completely closed position. The press is then opened, whereupon steaming or blowing off of gases is permitted, as heretofore described, the upper half of the mold being counter-balanced by compression springs 28. When the mold reaches the second step of the press, it is closed as additional thirty-second of an inch, after which the pressure is again relieved and gases are permitted to blow off. This steaming process is repeated through a complete series of pressings, until at the end of the press the mold is finally completely closed. At this time the latches engage and the mold is kept in locked condition.

It will be understood that the speed of the press may be increased or the speed of conveyor 86 decreased and arranged for slow intermittent or long dwell operation, and the press and conveyor so synchronized that the mold will undergo two or even three pressings at each of the steps of the press, thereby permitting a greatly increased number of alternate pressing and blowing off periods in the complete operation of steaming and closing the mold.

The closed and locked mold is then fed by conveyor 86 to an elevator 102. This elevator, like lowerators 82 and 84, preferably consists of drivers 104 located outside of conveyor 86. The arrangement is best shown in Fig. 3, in which it will be observed that the elevator consists of separate pairs of chains 102 passing over drivers 104 located outside of horizontal conveyor 86. The molds are carried by elevator 102 upwardly through the first portion 106 of a baking oven, the main part 108 of which extends horizontally over the apparatus heretofore described, so that the molds are brought back to the loading station.

When the molds reach the top of the driver of elevator 102, they are transferred by means, not shown, to a horizontal conveyor 110 operating over drivers 112. This conveyor carries the molds through oven 108 to the completion of the desired baking operation. The timing of the apparatus and the length of the oven are so related that a desired baking time, say five minutes, is obtained.

The heating means for the oven is not shown, but may, for example, consist of a series of gas burners located along the walls of the oven. The baking temperature may be kept between 250 and 300° F., but preferably is increased to about 350° F. near the end of the baking operation. This may be accomplished by adjusting the heat generated within the oven, or by relying upon a time lag in the mold coming up to the maximum temperature in the oven. In any case, as the molds reach the latter portion of oven 108, the core 20, which meanwhile is amply heated through hollow arbor 16, is heated beyond the baking temperature and reaches its fusion temperature and consequently begins to flow from the mold. The molten metal thus discharged is collected by a trough 114 at the bottom of the oven terminating in a drain pipe 116, which is led directly back to a nearby die-casting machine in which the cores 20 are being cast as rapidly as needed for the operation of the complete installation.

The molds are fed by conveyor 110 to lowerator 82 which, like elevator 102, is operated by outside drivers 118. Meanwhile, the latches 58 are opened by camming rails or other appropriate mechanism, and the upper half of the mold is caught and retained and thereby separated from the lower half of the mold at a point opposite trackway 120. The lower half of the mold continues its downward travel in lowerator 82 until it is finally deposited upon conveyor 86, at which time it is unloaded and again loaded during its passage through loading station 80, as has already been described. In the meantime, the upper half of the mold is moved along track 120 by appropriate means, here shown as the lower half of the oven conveyor 110. The upper halves of the mold are thereby transferred to lowerator 84, operating on outside drivers 122, and finally are again deposited upon and rejoin the mating bottom mold.

If the auxiliary electrical heating unit described in connection with Fig. 8 is used during or near the end of the baking operation, the said unit may be energized by current fed through a trolley wire system within oven 108, that is, each mold may be provided with contacting elements which engage feed wires or tracks within the oven, and the time of heating of the resistance elements may be determined by the location and length of the said trolley or feed wires.

The foregoing relatively generalized description may be amplified with particular reference to Figs. 10 to 15 of the drawings which bring out details of the construction and mechanism which could not conveniently be included in the figures of the drawings already referred to because of obvious limitations in the permissible scale or size of the drawings. These details include means for insuring closing of the latches when the molds are closed, means for transferring the molds from the elevator to the oven conveyor, means for transferring the molds from the oven conveyor to the lowerator and for insuring precise centering of the molds on the lowerator, means for opening the latches and for arresting downward movement of the top mold portion, means for insuring continued downward movement of the bottom mold portion in order to open the mold, and means for transferring the top mold portion to conveyor means for moving the same to the lowerator 84, thereby closing the mold and repeating the molding cycle.

Figure 13:
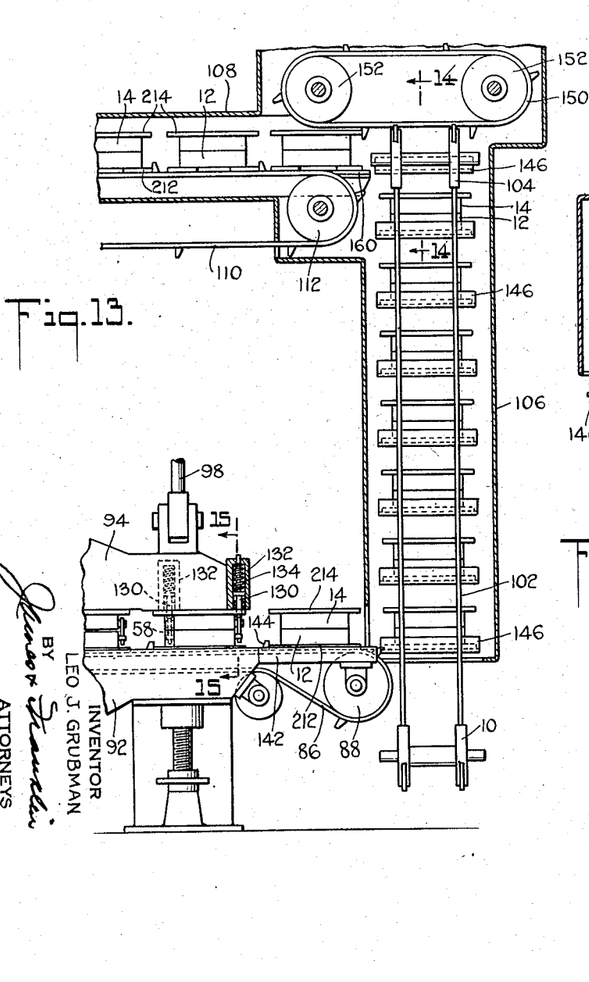
Fig. 13 is an enlarged elevation of the elevator end of the apparatus.
Figure 15:
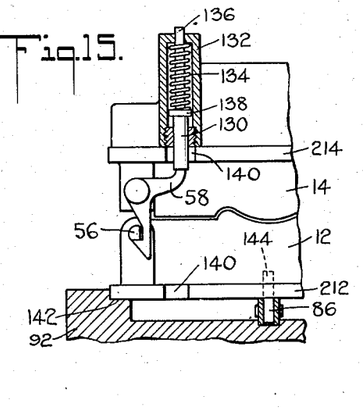
Fig. 15 is a section in the plane of the line 15—15 of Fig. 13.

Referring to Figs. 13 and 15, the means for insuring closing of the mold latches comprises a pair of plungers 130 mounted for vertical reciprocation in appropriate spring housings 132 forming a part of the upper press head 94 and located at the final or closing step thereof. The plungers 130 are located directly above the ends of latches 58, as will be evident from inspection of Fig. 15, and are constantly urged downwardly by compression springs 134 contained within housing 132 and surrounding the upward extension 136 of the plunger, the spring 134 being compressed between the top of the housing and a collar 138 on the plunger. It will thus be evident that upon closing movement of the press, the mold at the last step thereof is not only closed but is locked in closed condition by reason of the pressure exerted by plungers 130 on latches 58.

Figure 4:
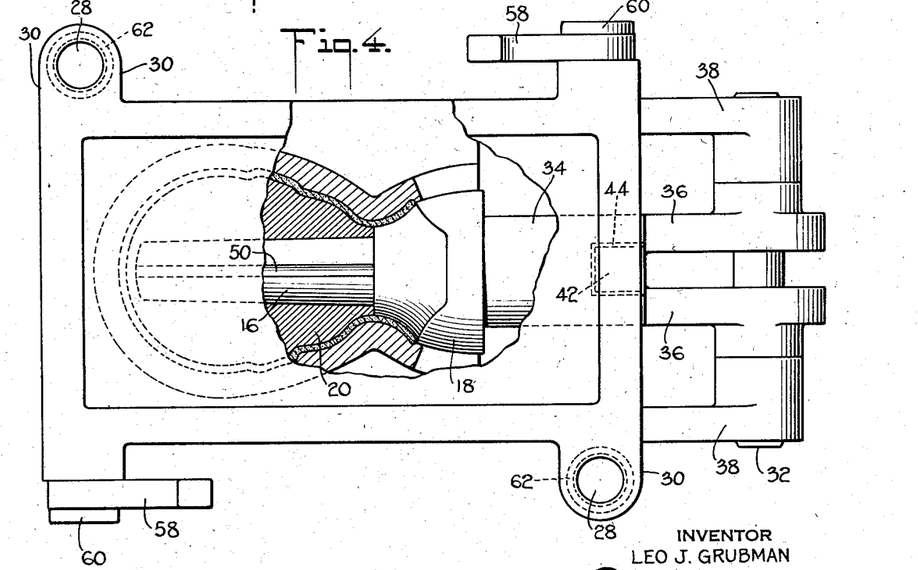
Fig. 4 is a partially sectioned plan view of a mold particularly designed for the practice of the present invention.
Figure 5:
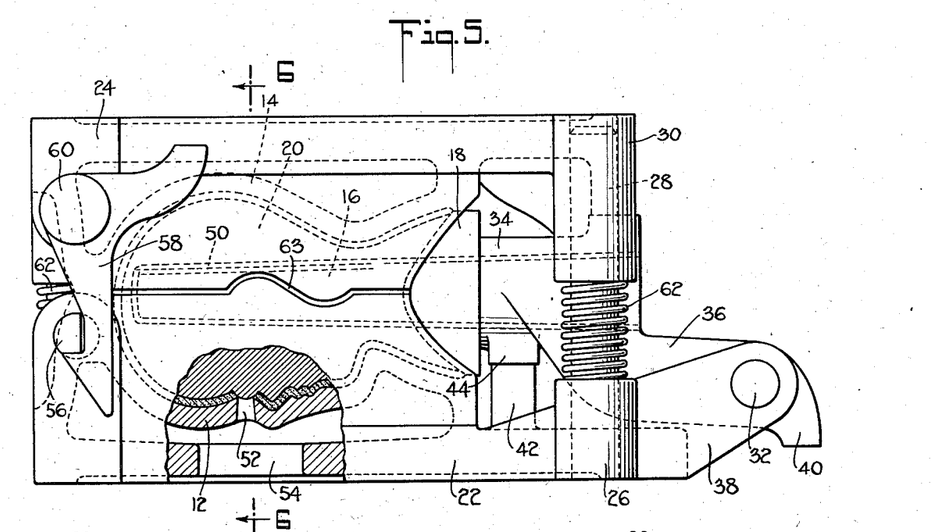
Fig. 5 is a partially sectioned side elevation of the same.
Figure 6:
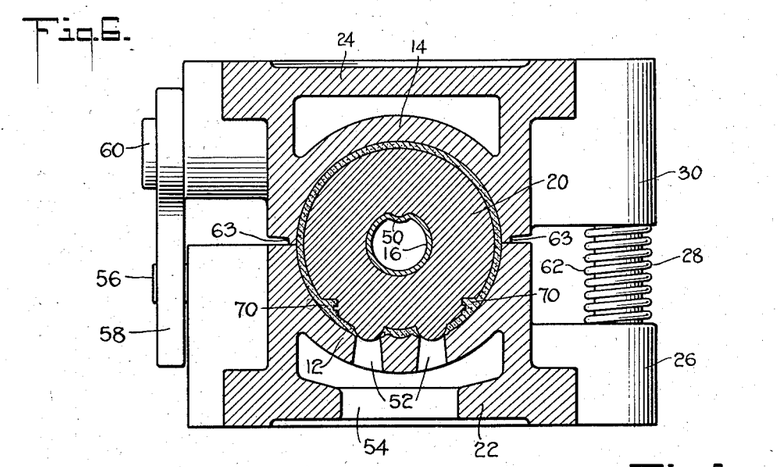
Fig. 6 is a section taken in the plane of the line 6—6 in Fig. 5.

It has already been mentioned that in Figs. 4, 5, and 6 the mold is incomplete by reason of the omission of top and bottom plates secured to the top and bottom halves of the mold and providing outwardly projecting flanges. These top and bottom plates are clearly shown in Figs. 10 to 15 of the drawings and are respectively numbered 214 and 212. Inasmuch as these plates are relatively large in area and cover the latches 58, they are cut away or recessed at 140 to provide access to the latches not only for the closing movement last described but also for a camming opening movement to be described later.

During movement of the molds through the press to the elevator 102, the bottom plates 212 of the mold slide along appropriate guide rails 142, the molds being moved by the conveyor 86 which is preferably in the form of an endless chain carrying the spaced pusher lugs 144.

Figure 14:
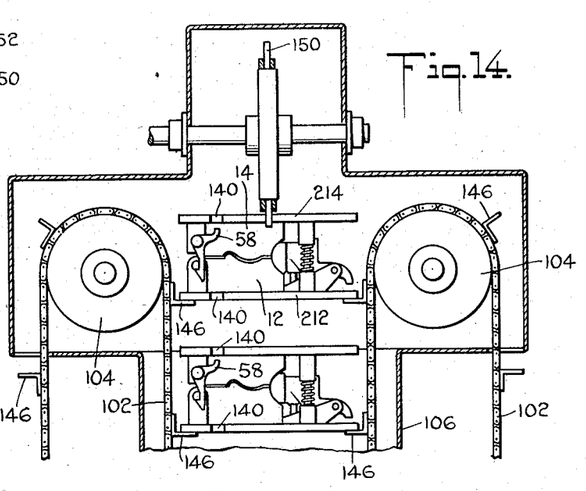
Fig. 14 is a section in the plane of the line 14—14 of Fig. 15.

The elevator comprises four endless chains 102 passing about appropriate sprockets or sheaves 104, the pair of chains 102 on each side being connected by horizontal supports or angle irons 146, these being most clearly shown in Fig. 14 and serving to keep the chain movement in synchronism and to maintain a uniform spacing of the chains. The elevator 102 dwells or is at rest with a pair of supports or angle irons 146 in alignment with the track 142 when the conveyor 86 moves, thereby permitting the latter to move a mold directly from the track 142 onto the supports 146. No precise centering of the mold on the chain is essential, and its location may be determined by relation to the arc of travel of the lug 144 as it rounds the final sprocket or sheave 88. As viewed in Fig. 13, the elevator has begun its upward movement just after being loaded with a mold near the bottom thereof and just after having been relieved of a mold near the upper end thereof.

Figures 10, 11, 12:
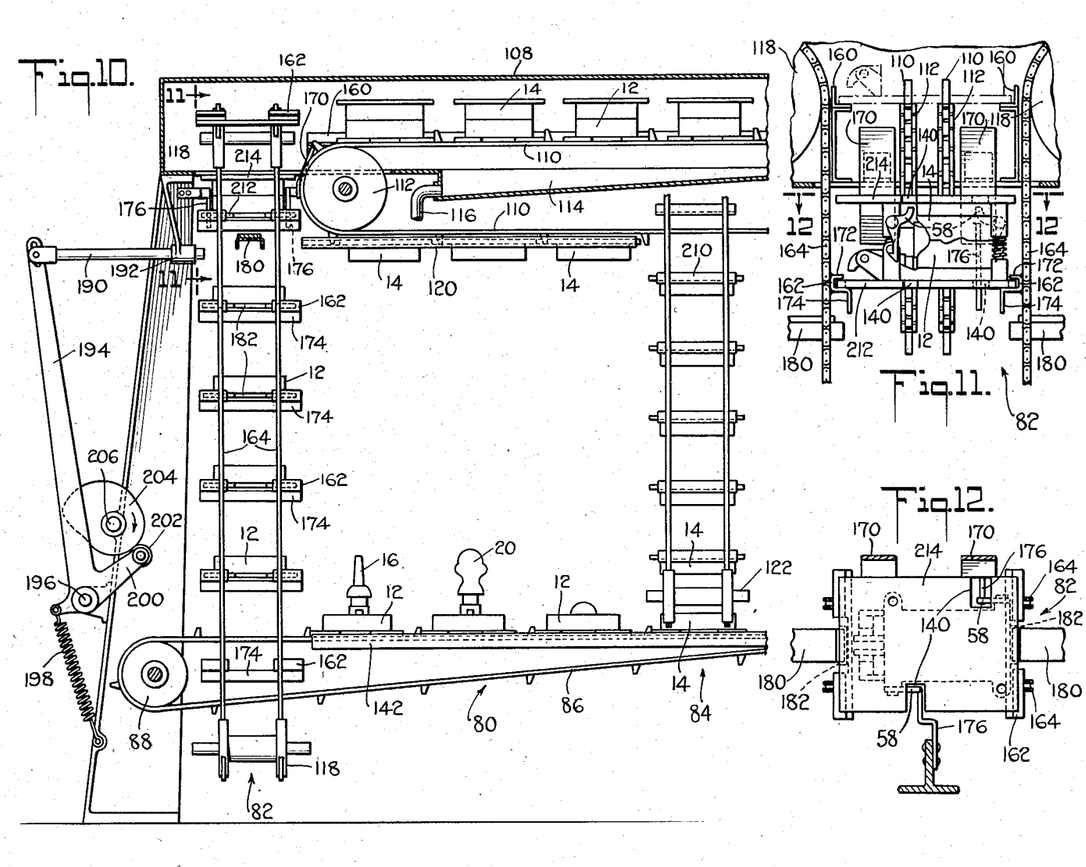
Fig. 10 is an enlarged elevation of the lowerator end of the apparatus.
Fig. 11 is a section in the plane of the line 11—11 of Fig. 10.
Fig. 12 is a section in the plane of the line 12—12 in Fig. 11.

The transfer of the molds from the elevator to the oven conveyor may be accomplished, if desired, by a reciprocable pusher such as is shown at the lowerator in Fig. 10, but in the present case is accomplished by means of a small auxiliary conveyor 150 best shown in Figs. 14 and 15. The auxiliary conveyor 150 runs about appropriate drive sprockets or sheaves 152 which may conveniently be made equal in diameter to the sprockets 112 of the oven conveyor, in which case the sprockets may be run in 1 to 1 ratio for synchronous movement of the oven conveyor 110 and the transfer conveyor 150. In practice it is simply necessary to gear the sprockets 112 and 152 together with simultaneous equal movement but in opposite directions, so that the conveyors 110 and 150 will move simultaneously and equally and in the same direction. In operation it will be understood that the mold is transferred from the elevator to the oven conveyor while the elevator is stationary or dwelling, the dwell period bringing the supports or angle irons 146 in horizontal alignment with an appropriate oven track 160. Consequently, movement of the oven conveyor moves the last mold on the track into the oven or to the left as viewed in Fig. 13, and at the same time the topmost mold on the elevator is moved by the auxiliary or transfer conveyor 150 from the elevator onto the track 160.

The transfer of the molds from the oven conveyor 110 to the lowerator 82 is accomplished by mechanism best shown in Figs. 10 and 11. For this purpose it may be assumed that the lowerator is dwelling or at rest while a mold is pushed onto the same by the oven conveyor 110, and, of course, for this purpose the supports 162 of the lowerator 82, which interconnect the pairs of side chains 164, are stopped in proper horizontal alignment with the track 160 of the oven. The oven conveyor 110, unlike the press conveyor 86, cannot be used to push the mold completely onto the supports 162 for the reason that the oven conveyor mechanism in the course of its arcuate movement around the sprockets or sheaves 112 must clear or escape the lowerator 82 and the molds carried thereby. In other words, whereas the elevator moves the molds upwardly out of the way of the press conveyor, the lowerator 82 moves the molds downwardly past the end of the oven conveyor. Furthermore, a precise and accurate location of the molds on the lowerator is desired in order to insure proper cooperation with mechanism later described.

To accomplish the desired result, the oven conveyor is moved as near to the lowerator as conveniently possible, thereby moving the molds nearly but not entirely into central position on the lowerator. The additional small necessary movement of the molds is accomplished in the present case by the use of stationary camming members 170 against which the trailing edge of the bottom plate 212 bears as the mold descends with the lowerator.

To insure that the mold will not be lifted upwardly from the supports 162 on the lowerator not only during the camming movement last described but also and more importantly during the subsequent opening movement of the mold, the supports 162 on lowerator 82 are preferably different from the simple angle iron supports used on the elevator, by reason of the provision of a top flange which serves to move the mold downward in a positive manner. This feature is best shown in Fig. 11 referring to which it will be observed that the supports 162 include not only bottom and side walls for receiving and guiding the marginal edges of the bottom plate 212 of the mold, but also top walls 172 which encompass the edges of the bottom plate. In other words, the supports receiving the bottom plate are channel-shaped rather than L-shaped. Furthermore, there is a depending wall 174 which extends from one chain to the other on each side of the mold and serves to space and rigidify the lowerator mechanism, this inwardly displaced connecting member 174 being desirable because the channel-shaped supports 162 are cut away or interrupted between the chains for reasons later described. The cutting away of the middle part of channels 162 is evident from inspection of Figs. 10 and 12.

As the topmost mold on lowerator 82 leaves the camming members 170, the latches 58 are opened by camming rails 176 which are in alignment with and pass through the slots or recesses 140 on the top and bottom plates of the mold, thereby bringing the same into bearing relation against the rounded arms of mold latches 58 and causing the same to be swung open.

The mold is opened by arresting the movement of the top mold portion while permitting continued downward movement of the bottom mold portion. This is accomplished by a pair of stop members 180 which project into the lowerator mechanism from each side between the chains 164, as is shown in all three of Figs. 10, 11, and 12. The stop members 180 lie in the path of the marginal portions of top plate 214 and arrest movement thereof. The bottom plate 212 is dimensioned to freely pass the top members 180, and it is for this reason that the ends of the bottom plate are cut away or recessed as is shown at 182 in Fig. 10. It is also for this reason that the supporting members or channels 162 of the lowerator mechanism are cut away between the chains 164, forming simple end portions interconnected and rigidified by the connecting bottom strips 174 already referred to.

The bottom mold portion is carried downwardly from the lowerator until it reaches horizontal alignment with the stationary bottom or press track 142 at the loading station 80, at which time the lowerator dwells and the press conveyor 86 moves, thereby transferring the bottom mold portion from the lowerator to the loading station.

The top mold portion is transferred from the stop members 180 to a stationary guide rail 120 by means of a horizontally reciprocable pusher member 190 slidable in a fixed bearing 192 mounted on the frame of the apparatus. This pusher member is so located as to bear against the end of a top mold portion 14 resting upon the stop members 180, so that inward reciprocation of the plunger moves the mold toward the right, at which time its leading edge is received by the guide track 120. The pusher 190 may move simultaneously with and in synchronism with the oven conveyor 110, thereby feeding the top mold portion smoothly into engagement with the conveyor.

Pusher 190 is reciprocated by an arm 194 pivoted at 196 and normally held in outward position by an appropriate spring 198. The arm 194 carries a bell crank cam follower arm 200 the cam follower roller 202 of which cooperates with a cam 204. Cam 204 is rotated by a shaft 206 geared in desired manner to the mechanism operating the press and oven conveyor.

The top mold portions 14 are moved along the guide or track 120 by the lower section of conveyor 110 until they reach the lowerator 84. It will be understood that transfer from track 120 to lowerator 84 is accomplished while the lowerator is dwelling or at rest and with the supports 210 of the lowerator in horizontal alignment with the track 120. The top mold portions are then moved downwardly by the lowerator, which resembles the lowerator 82 in comprising pairs of sprockets or sheaves 122 on each side of the horizontal conveyor mechanism. Lowerator 84 finally deposits the top mold portion 12 upon the bottom mold portion 14 at the end of the loading station 80, this being accomplished, of course, while the press conveyor is at rest. The subsequent horizontal movement of the press conveyor then carries not only the bottom mold portion 14 but also the mating top mold portion 12 into the press, the mold portions being held together and in alignment by the dowel pins 28 heretofore described.

It will be recollected, of course, that during the intermittent movement of the bottom mold portions past the loading station 80, the finished head is removed from the mold and the mold is loaded with appropriate tablets of molding material and with a destructible core 20 which is applied to the tapered arbor 16.

In general, it will be understood that the driving mechanism for the mold moving system is so arranged that the horizontal press, oven, and transfer conveyors are moved simultaneously, equally, and intermittently, the movement taking place while the elevator and lowerators are at rest and while the press is open; and that the elevator and lowerators are moved simultaneously, equally, and intermittently, the movement taking place while the horizontal conveyors are at rest and while the press is closed or exerting pressure on the molds therein.

To briefly summarize the operation of the apparatus, a bottom mold portion is loaded with a fusible core and with molding material at loading station 80, after which the cover portion is applied to the mold by lowerator 84 whereupon the mold is moved intermittently through the stepped press. In the stepped press the mold portions are progressively moved together until the mold is closed, at which time it is latched and kept closed. Between the successive progressive closing movements the pressure of the press is released from the mold and even the weight of the top portion of the mold is largely relieved, thereby permitting free venting of gases from the heated molding material. The locked mold is then elevated to the oven conveyor whereupon it is moved through the oven wherein the head is baked and progressively heated until finally the fusible core melts and runs out through the eye or/and mouth openings and is collected for re-use. The mold is then transferred to lowerator 82, and in the course of descent the latches are opened and the top mold portion is separated from the bottom mold portion, the top mold portion being pushed onto guide track 120 and thence to the mold-closing lowerator 84, while the bottom portion is forced downwardly to the press conveyor by which it is moved through the loading station 80 where the head is removed and the mold again loaded.

It is believed that the present invention and the many advantages thereof, will, for the most part, be apparent from the foregoing detailed description. It makes possible continuous automatic machine production of dolls' heads at a rapid rate. The heads produced are molded in a single operation and dispense with the necessity of cementing separate halves together and consequent grinding, patching, and sandpaperig steps. The nature of the material of the resulting head is wholly different from that heretofore produced, although using for raw material the conventional cheap wood flour or pulp mixture. The present product is hard, dense, exceedingly strong, accurately defined, and characterized by a smooth finish. The wall of the head may be made thin and light, and yet is almost unbreakable. It is so smooth that painting and finishing colors may be applied directly to the surface without a sizing or dipping operation. Consequently, mouth or eye openings may be formed in the head, and such openings are formed directly while molding and may be made exceedingly accurate in configuration and location, so that besides dispensing with punching and frazing operations, an accurate fit with the eye set may be obtained. Mounting means for the eye set, regardless of the desired shape and type, may readily be provided, for the core need not be retractible from the head, but instead is melted out. The raw material used in the molding operation is preferably formed into tablets, and this accurately defines the quantity of material used, as well as increases the convenience with which the lower and upper halves of the mold may be loaded with the molding material. The factors of pressure, time, and temperature involved throughout the process may be kept absolutely uniform, so that the product will be reproducible and uniform. The steaming and pressing operation which is applied to the molding material before the mold is closed, locked and baked, insures complete discharge of volatile products formed by reaction of the molding mixture under heat and pressure, and the product is consequently entirely free of blow-holes, flaws, or even porosity, and instead is an impervious, almost polished product. This desirable complete discharge or blowing off of gases during the steaming process is greatly aided by removing the weight of the mold during the blow-off periods, and yet the halves of the mold are not mechanically separated with consequent injury of the embryo head at the parting face of the mold.

It will be apparent that while I have shown and described my invention in preferred form, many changes and modifications may be made in the structure disclosed without departing from the spirit of the invention, defined in the following claims.

I claim:

1. A mold for the molding of a complete hollow doll's head, said mold comprising separable top and bottom portions, the bottom portion corresponding to the face of the head and being provided with eye and mouth openings, an indestructible tapered core-locating arbor extending through the neck opening of the head, a low temperature fusible metal core on said arbor and having projections fitting the aforesaid openings and adapted to form eye and mouth openings in the head, pins extending from the bottom mold into the top mold for aligning the same, latch means for locking the mold in closed condition, top and bottom plates secured on the backs of the top and bottom molds respectively and providing substantial outwardly projecting flanges for cooperation with appropriate mold moving guides, said plates being cut away in alignment with the aforesaid latch means and said bottom plate being additionally cut away relative to the top plate to permit arresting of the top plate by supports which pass the bottom plate, thereby opening the mold.

2. Molding apparatus comprising a heated press having elongated relatively movable heads one of which is stepped to progressively diminish the spacing therebetween, a separable mold, a baking oven separate from said press, means to relatively reciprocate the heads of the press, and means for moving the mold through the press in order to progressively move the mold portions together until closed, whereby the pressure on the mold is relieved between the progressive closing movements, and means for transferring the closed mold to the oven.

3. Apparatus for the molding of a hollow doll part out of the conventional wood pulp and starch material, comprising a heated press having elongated relatively movable heads one of which is stepped to progressively diminish the spacing therebetween, a separable mold including a destructible core, and latch means for locking the mold in closed condition, a baking oven separate from said press, means to repeatedly open and close the press, and conveyor means for moving the mold through the press in the direction of diminished spacing in order to progressively close the mold portions together until locked, the opening movements of the press causing the pressure on the mold to be relieved between the progressive closing movements, and additional conveyor means for transferring the heated locked mold to the oven.

4. Apparatus for the molding of a complete hollow doll's head out of the conventional wood pulp and starch material in a single operation, comprising a heated press having elongated relatively movable heads one of which is stepped to progressively diminish the spacing therebetween, a separable mold including a destructible core and latch means for locking the mold in closed condition, a baking oven separate from said press, means to repeatedly open and close the press, and conveyor means for moving the mold through the press in the direction of diminished spacing in order to progressively close the mold portions together until locked, the opening movements of the press causing the pressure on the mold to be relieved between the progressive closing movements, additional conveyor means for transferring the heated locked mold to the oven in order to bake the head, means to open the mold to empty and refill the same, and means to again close and move the mold through the press, thereby repeating the molding cycle.

5. Molding apparatus comprising a press, a separable mold, a baking oven located above the press, a first conveyor for moving the mold through the press, a second conveyor for moving the mold through the oven, an elevator at the exit end of the press for elevating the mold from the press conveyor to the oven conveyor, a lowerator at the exit end of the oven for lowering the mold from the oven conveyor to the press conveyor, means for arresting downward movement of the top mold portion in order to open the mold, to permit imptying and refilling of the mold, and means to replace the top mould portion on the bottom mold portion to repeat the molding cycle.

6. Molding apparatus comprising a press, a separable mold, a baking oven located above the press, a first conveyor for moving the mold past a loading station and through the press, a second conveyor for moving the mold through the oven, an elevator at the exit end of the press for elevating the mold from the press conveyor to the oven conveyor, a lowerator at the exit end of the oven for lowering the mold from the oven conveyor to the press conveyor, means for arresting downward movement of the top mold portion, a lowerator located at the entrant end of the press, and means to move the top mold to said lowerator, whereby it is again placed upon the mating bottom mold leaving the loading station, to repeat the molding cycle.

7. Molding apparatus comprising a press having elongated relatively movable heads one of which is stepped from the entrant to the exit end to progressively diminish the spacing therebetween, means to repeatedly open and close the press, a separable mold, an elongated baking oven located above the press, a first horizontal conveyor for moving the mold past a loading station and through the press from the entrant to the exit end thereof in order to progressively force the mold portions together until closed, a second horizontal conveyor for moving the mold through the oven, an elevator at the exit end of the press for elevating the mold from the press conveyor to the oven conveyor, a lowerator at the exit end of the oven for lowering the mold from the oven conveyor to the press conveyor, means for arresting downward movement of the top mold portion, a lowerator located at the entrant end of the press, and means to move the top mold to said lowerator, whereby it is again placed upon the mating bottom mold leaving the loading station, to repeat the molding cycle.

8. Apparatus for the molding of a hollow doll part out of the conventional wood pulp and starch material in a single operation, comprising a heated press having elongated relatively movable heads one of which is stepped from the entrant to the exit end to progressively diminish the spacing therebetween, means to repeatedly open and close the press, a separable mold including a destructible core, and latch means for locking the mold in closed condition, an elongated baking oven located above the press, a first horizontal conveyor for moving the mold past a loading station and through the press from the entrant to the exit end thereof in order to progressively close the mold portions together until locked, the pressure on the mold being relieved between the progressive closing movements, a second horizontal conveyor for moving the mold through the oven, an elevator at the exit end of the press for elevating the mold from the press conveyor to the oven conveyor, a lowerator at the exit end of the oven for lowering the mold from the oven conveyor to the press conveyor, means for opening the latches and arresting downward movement of the top mold portion, a lowerator located at the entrant end of the press, and means to move the top mold to said lowerator, whereby it is again placed upon the mating bottom mold leaving the loading station, to repeat the molding cycle.

9. Apparatus for the molding of a complete hollow doll's head out of the conventional wood pulp and starch material in a single operation, comprising a heated press having elongated relatively movable heads one of which is stepped from the entrant to the exit end to progressively diminish the spacing therebetween, a separable mold including a low temperature fusible core, resilient means partially relieving the weight of the top mold portion, and latch means for locking the mold in closed condition, an elongated baking oven located above the press, a first horizontal conveyor for moving the mold past a loading station and through the press from the entrant to the exit end thereof in order to progressively close the mold portions together until locked, the pressure on the mold being relieved between the progressive closing movements, a second horizontal conveyor for moving the mold through the oven in order to bake the head and melt out the core, means for collecting and draining the fused core metal, an elevator at the exit end of the press for elevating the mold from the press conveyor to the oven conveyor, a lowerator at the exit end of the oven for lowering the mold from the oven conveyor to the press conveyor, means for opening the latches and arresting downward movement of the top mold portion, a lowerator located at the entrant end of the press, and means to move the top mold to said lowerator, whereby it is again placed upon the mating bottom mold leaving the loading station, to repeat the molding cycle.

10. Molding apparatus comprising a press, a separable mold, a baking oven located above the press, a press conveyor for moving the mold through the press, an oven conveyor for moving the mold through the oven, an elevator at the exit end of the press for elevating the mold from the press conveyor to the oven conveyor, a lowerator at the exit end of the oven for lowering the lower half of the mold from the oven conveyor to the press conveyor, means at said lowerator for separating the top mold portion from the bottom mold portion, in order to permit emptying and refilling of the mold, and means to replace the top mold portion on the bottom mold portion to repeat the molding cycle.

11. Molding apparatus comprising a press, a separable mold, a baking oven located above the press, a press conveyor for moving the mold past a loading station and through the press, an oven conveyor for moving the mold through the oven, an elevator at the exit end of the press for elevating the mold from the press conveyor to the oven conveyor, a lowerator at the exit end of the oven for lowering the bottom mold from the oven conveyor to the press conveyor, means to separate the top and bottom molds before reaching the press conveyor, a lowerator located at the entrant end of the press, and means to move the top mold to said latter lowerator, whereby it is again placed upon the mating bottom mold leaving the loading station, to repeat the molding cycle.

12. Molding apparatus comprising a press having elongated relatively movable heads one of which is stepped from the entrant to the exit end to progressively diminish the spacing therebetween, a separable mold, an elongated baking oven located above the press, a first horizontal conveyor for moving the mold past a loading station and through the press from the entrant to the exit end thereof in order to progressively force the mold portions together until closed, whereby the pressure on the mold is relieved between the progressive closing movements, a second horizontal conveyor for moving the mold through the oven, an elevator at the exit end of the press for elevating the mold from the first or press conveyor to the second or oven conveyor, a lowerator at the exit end of the oven for lowering the bottom mold from the second or oven conveyor to the first or press conveyor, means to separate the top and bottom molds before reaching the press conveyor, a lowerator located at the entrant end of the press, and means to move the top mold to said latter lowerator, whereby it is again placed upon the mating bottom mold leaving the loading station, to repeat the molding cycle.

13. Apparatus for the molding of a complete hollow doll's head in a single operation, comprising a heated press having elongated relatively movable heads one of which is stepped from the entrant to the exit end to progressively diminish the spacing therebetween, means to repeatedly open and close the press, a separable mold including a low temperature fusible core, latch means for locking the mold in closed condition, a baking oven separate from the press, means for moving the mold through the press to progressively close the mold portions together until locked, and means for transferring the closed mold to the oven in order to bake the head and fuse the core during the baking operation.

LEO J. GRUBMAN.